(12) United States Patent
Tang et al.

(10) Patent No.: US 10,867,339 B2
(45) Date of Patent: *Dec. 15, 2020

(54) GENERATING A PRODUCT RECOMMENDATION BASED ON A USER REACTION

(71) Applicant: Capital One Services, LLC, McLean, VA (US)

(72) Inventors: Qiaochu Tang, The Colony, TX (US); Jason Hoover, Grapevine, TX (US); Micah Price, Anna, TX (US); Geoffrey Dagley, McKinney, TX (US); Stephen Wylie, Carrollton, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/663,560

(22) Filed: Oct. 25, 2019

(65) Prior Publication Data

US 2020/0226658 A1    Jul. 16, 2020

Related U.S. Application Data

(63) Continuation of application No. 16/249,062, filed on Jan. 16, 2019, now Pat. No. 10,475,106.

(51) Int. Cl.
*G06Q 30/00* (2012.01)
*G06Q 30/06* (2012.01)
(Continued)

(52) U.S. Cl.
CPC ........ *G06Q 30/0631* (2013.01); *G06F 3/013* (2013.01); *G06F 16/54* (2019.01);
(Continued)

(58) Field of Classification Search
CPC .................................................. G06Q 30/0631
See application file for complete search history.

(56) References Cited

U.S. PATENT DOCUMENTS

| 8,386,336 B1 | 2/2013 | Fox et al. |
| 9,536,329 B2 | 1/2017 | Saxena et al. |
| (Continued) | | |

OTHER PUBLICATIONS

Zhao S., et al., "Video Classification and Recommendation Based on Affective Analysis of Viewers", Neurocomputing, 2013, vol. 119, pp. 101-110. Retrieved from [URL: http://dx.doi.org/10.1016/j.neucom.2012.04.042].

*Primary Examiner* — Kathleen Palavecino
(74) *Attorney, Agent, or Firm* — Harrity & Harrity, LLP

(57) ABSTRACT

A device may process, after obtaining an image that includes image data concerning a product, first audio data obtained concerning a first utterance of a user of a user device, and first video data obtained concerning a first eye gaze direction of the user, to determine a first reaction of the user to the image. The device may process, after causing display of the image and an overlay superimposed on the image by the user device, second audio data obtained concerning a second utterance of the user, and second video data obtained concerning a second eye gaze direction of the user, to determine a second reaction of the user to the image and the overlay. The device may retrain a product recommendation model using the first reaction and the second reaction, and may generate and cause display of a product recommendation based on the product recommendation model.

20 Claims, 10 Drawing Sheets

(51) Int. Cl.
*G06F 16/54* (2019.01)
*G06F 3/01* (2006.01)
*G06T 11/60* (2006.01)
*G06K 9/00* (2006.01)
*G06N 20/00* (2019.01)

(52) U.S. Cl.
CPC ......... *G06K 9/00302* (2013.01); *G06N 20/00* (2019.01); *G06Q 30/0641* (2013.01); *G06T 11/60* (2013.01)

(56) References Cited

U.S. PATENT DOCUMENTS

| | | |
|---|---|---|
| 9,646,198 B2 | 5/2017 | Cunico et al. |
| 10,019,489 B1 | 7/2018 | Adair et al. |
| 10,475,106 B1 | 11/2019 | Tang et al. |
| 2015/0350730 A1 | 12/2015 | El Kaliouby et al. |

GENERATING A PRODUCT RECOMMENDATION BASED ON A USER REACTION

RELATED APPLICATION

This application is a continuation of U.S. patent application Ser. No. 16/249,062, filed Jan. 16, 2019 (now U.S. Pat. No. 10,475,106), which is incorporated herein by reference.

BACKGROUND

A user device may obtain an image concerning a product and video data and/or audio data concerning a person. The video data and/or audio data may include information concerning a reaction of the person in relation to the product.

SUMMARY

According to some possible implementations, a method may include obtaining, by a user device, an image data concerning a product. The method may include obtaining, by the user device and after obtaining the image data, first audio data concerning a first utterance of a user of the user device, obtaining, by the user device and after obtaining the image data, first video data concerning a first facial expression of the user, and processing, by the user device, the first audio data and the first video data to determine a first reaction of the user to the product. The method may include causing, by the user device and after obtaining the image data, display of an augmented reality (AR) overlay superimposed on the image data by the user device. The method may include obtaining, by the user device and after causing display of AR overlay, second audio data concerning a second utterance of the user, obtaining, by the user device and after causing display of the AR overlay, second video data concerning a second facial expression of the user, and processing, by the user device, the second audio data and the second video data to determine a second reaction of the user to the AR overlay. The method may include updating, by the user device, a product recommendation model based on the first reaction and the second reaction, generating, by the user device, a product recommendation based on the product recommendation model, and causing, by the user device, display of the product recommendation by the user device.

According to some possible implementations, a device may include one or more memories, and one or more processors, communicatively coupled to the one or more memories, to obtain an image that includes image data concerning a product. The one or more processors may prompt a user of the user device to comment on the product, obtain, after prompting the user to comment on the product, first audio data concerning a first utterance of the user, obtain, after prompting the user to comment on the product, first video data concerning a first facial expression of the user, and process the first audio data and the first video data to determine a first reaction of the user to the product. The one or more processors may cause, after obtaining the image, display of the image and an augmented reality (AR) overlay superimposed on the image by the user device. The one or more processors may prompt the user to comment on the display of the image and the AR overlay, obtain, after prompting the user to comment on the display of the image and the AR overlay, second audio data concerning a second utterance of the user, obtain, after prompting the user to comment on the display of the image and the AR overlay, second video data concerning a second facial expression of the user, and process the second audio data and the second video data to determine a second reaction of the user to the image and the AR overlay. The one or more processors may train a product recommendation model using the first reaction and the second reaction, generate a product recommendation profile based on the product recommendation model, and send the product recommendation profile to a remote device.

According to some possible implementations, a non-transitory computer-readable medium may store instructions that include one or more instructions that, when executed by one or more processors of a device, cause the one or more processors to obtain an image that includes image data concerning a product. The one or more instructions may cause the one or more processors to obtain, after obtaining the image, first audio data concerning a first utterance of a user of a user device, obtain, after obtaining the image, first video data concerning a first eye gaze direction of the user, and process the first audio data and the first video data to determine a first reaction of the user to the image. The one or more instructions may cause the one or more processors to cause, after obtaining the image, display of the image and an overlay superimposed on the image by the user device, obtain, after causing display of the image and the overlay, second audio data concerning a second utterance of the user, obtain, after causing display of the image and the overlay, second video data concerning a second eye gaze direction of the user, and process the second audio data and the second video data to determine a second reaction of the user to the image and the overlay. The one or more instructions may cause the one or more processors to retrain a product recommendation model using the first reaction and the second reaction, generate a product recommendation based on the product recommendation model, and cause display of the product recommendation by the user device.

DETAILED DESCRIPTION

Figure 1A:
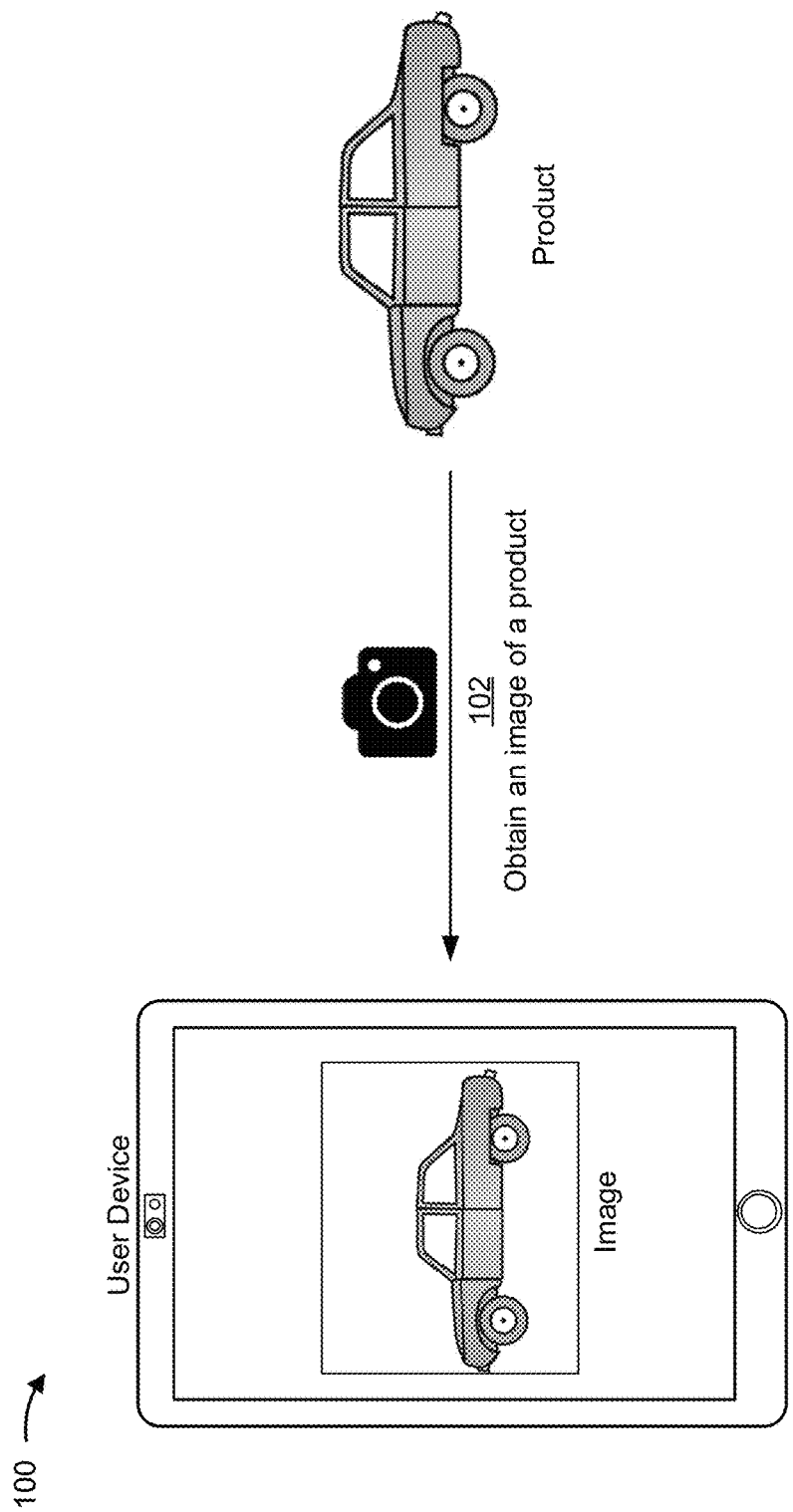
FIGS. 1A-1E are diagrams of example implementations described herein.

The following detailed description of example implementations refers to the accompanying drawings. The same reference numbers in different drawings may identify the same or similar elements.

A customer may use a user device to shop for a product (e.g., via an application executed by the user device). In some cases, the customer may use the user device to take a picture of a product that the customer wants to buy. For example, the customer may use the user device to take a picture of a car at a car dealership that the customer wants to purchase. In some cases, the customer may use the user device to take a picture of a product to find a similar product to purchase. For example, the customer may use the user device to take a picture of a car on the street to find listings of similar cars for sale. In some cases, the customer may be motivated to buy a product based on one or more factors, such as the customer's desire to buy the product, the customer's familiarity with the product, one or more attributes of the product, a type of product, a price of the product, and/or the like. However, a seller may not be able to discern in detail how the one or more factors affect the customers' desire to buy the product or a related product.

Some implementations described herein provide a device that is capable of processing audio data and/or video data concerning a user to determine a reaction of the user in relation to a product, an image of the product, product information, an overlay that includes the product information or a subset of product information, and/or the like. In some implementations, the device may obtain an image or image data of a product and/or product information, first audio data concerning a first utterance of the user, first video data concerning a first facial expression and/or a first eye gaze direction of the user. In some implementations, the device may process the first audio data and/or the first video data (e.g., in real-time or substantially real-time) to determine a first reaction of the user to the product, the product information, and/or the image. In some implementations, the device may cause display of the image and an overlay that includes product information. In some implementations, the device may obtain second audio data concerning a second utterance of the user, second video data concerning a second facial expression and/or a second eye gaze direction of the user. In some implementations, the device may process the second audio data and/or the second video data (e.g., in real-time or substantially real-time) to determine a second reaction of the user to the image and/or the overlay. In some implementations, the device may update a product recommendation model based on the first reaction and/or the second reaction. In some implementations, the device may generate a product recommendation and/or a product recommendation profile based on the product recommendation model. In some implementations, the device may cause display of the product recommendation. In some implementations, the device may send the product recommendation profile to a server device, which can process the product recommendation profile to generate one or more product recommendations.

In this way, implementations described herein enable the device to gather granular data on how users react to products, images of products, product information, overlays that include product information, and/or the like, regardless of whether the user purchases the products. In this way, the device may update the product recommendation model to generate product recommendations that the user may like, which may increase a likelihood of a product purchase by the user and/or reduce the amount of time for the user to identify a desired product and/or purchase the product. This may conserve device resources (e.g., processing resources, memory resources, power resources, and/or the like) that the user would otherwise use to search for a product of interest using the device. This may also conserve networking resources that would otherwise be used to facilitate the search. This may also increase a seller's sales and/or revenue and decrease costs associated with maintaining products in inventory or product advertising.

In this way, the process for determining a product recommendation and/or a product recommendation profile is automated and the device may determine numerous (e.g., hundreds, thousands, millions, and/or the like) actions at the same time. This may improve speed and efficiency of the process and conserve computing resources (e.g., processor resources, memory resources, and/or the like) of the device. Furthermore, implementations described herein use a rigorous, computerized process to perform tasks or roles that were not previously performed. For example, currently there does not exist a technique to automatically determine a product recommendation and/or a product recommendation profile based on reactions of a user to a product, an image of the product, product information, an overlay that includes product information, and/or the like. Finally, automating the process for determining a product recommendation and/or a product recommendation profile conserves computing resources (e.g., processor resources, memory resources, and/or the like) that would otherwise be wasted to determine a product recommendation and/or a product recommendation profile based on reactions of a user to a product, an image of the product, product information, an overlay that includes product information, and/or the like by hand.

FIGS. 1A-1E are diagrams of example implementations 100 described herein. In some implementations, a user device (e.g., a mobile phone, a smartphone, a laptop computer, a tablet computer, and/or the like) and a server device (e.g., one or more devices capable of receiving, generating, storing, processing, and/or providing information associated with generating a product recommendation and/or a product recommendation profile) may be connected via a network, such as the Internet, an intranet, and/or the like. In some implementations, the user device may include a camera device (e.g., one or more cameras) configured to obtain images and/or video data, one or more microphones configured to obtain audio data, and one or more applications (e.g., provided by, or associated with, an entity, such as a financial institution (e.g., a bank and/or the like), a merchant, a distributor, a supplier, and/or the like) capable of facilitating obtainment of images, image data, video data, audio data, and/or the like. In some implementations, the user may execute the one or more applications on the user device to obtain an image, image data, video data, audio data, and/or the like.

As shown in FIG. 1A and by reference number 102, the user device may obtain an image of a product. In some implementations, the product may include a vehicle, such as a car, a motorcycle, a boat, a plane, and/or the like, a consumer electronic product, such as a television, a desktop computer, a laptop computer, a tablet computer, a mobile device, headphones, and/or the like, and/or any other type of physical product. In some implementations, the product has one or more particular product types. For example, for a car, a particular product type may indicate a make of the car, a transmission type of the car (e.g., automatic or manual), a body style of the car (e.g., sedan, coupe, minivan, and/or the like), and/or the like. In some implementations, the image may include image data concerning the product.

In some implementations, the user device (e.g., via the user device executing the one or more applications) may obtain an image or image data of the product with the camera device of the user device. In some implementations, the user device may automatically obtain the image when the product is in a field of view of a camera of the camera device. In some implementations, the user device may obtain the image with the camera upon the user inputting a command into the user device to obtain the image. In some implementations, the user device may obtain the image or image data of the product from a different device, such as the server device. For example, an application of the one or more applications may be a web browser and the user device may run the web browser to navigate to a website that has image or image data of the product. The user device may download the image or image from the different device that hosts the image or image data. In some implementations, the user device may temporarily store the image or image data in memory (e.g., volatile memory) for a particular amount of time, such as an amount of time needed for the user device to process the image.

Figure 1B:
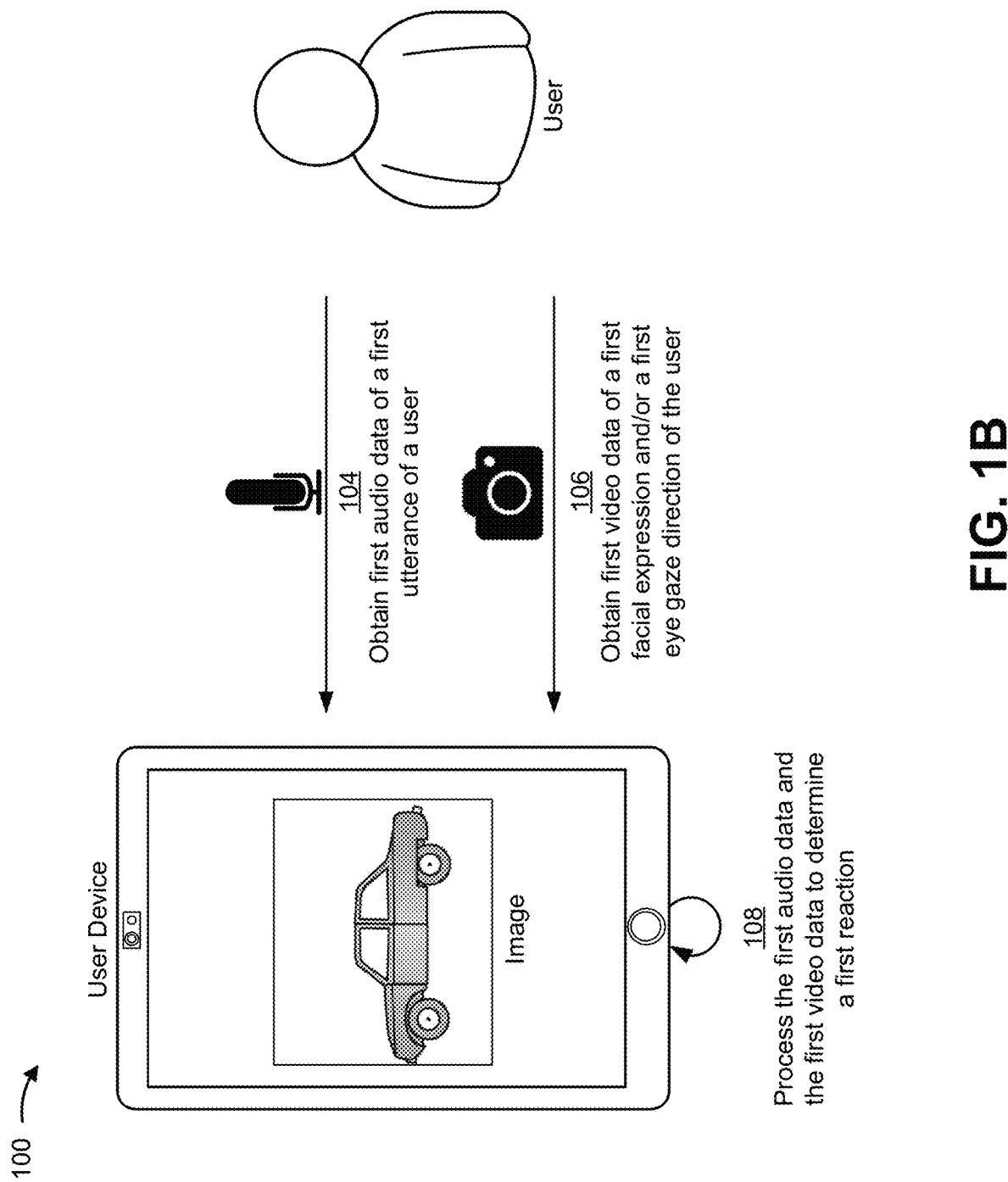

As shown in FIG. 1B, the user device may obtain and process audio data and video data concerning the user to determine a first reaction of the user. As shown by reference number 104, the user device may obtain first audio data of a first utterance of the user. In some implementations, the user device may temporarily store the first audio data in memory (e.g., volatile memory) for a particular amount of time, such as an amount of time needed for the user device to process the first audio data. In some implementations, the user may make the first utterance (e.g., speak about the product) at the same time (or substantially the same time) as the user device obtains the image. In some implementations, the user device (e.g., via the user device executing the one or more applications) may obtain the first audio data of the first utterance using the one or more microphones of the user device. In some implementations, the user device may obtain the first audio data after the user device obtains the image. In some implementations, the first utterance concerns the product and/or the image.

In some implementations, the user device may prompt the user to comment on the product. For example, after obtaining the image or while obtaining the image, the user device (e.g., via the user device executing the one or more applications) may display a visual message that instructs the user to speak about the product, such as to indicate what the user thinks about the product, indicate how the product makes the user feel, describe the product and/or a product attribute, and/or the like. Additionally, or alternatively, the user device may play an auditory message that instructs the user to speak about the product. In some implementations, the user device may obtain the first audio data after the user device prompts the user to comment on the product.

As shown by reference number 106, the user device may obtain first video data of a first facial expression and/or a first eye gaze direction of the user. In some implementations, the user device may temporarily store the first video data in memory (e.g., volatile memory) for a particular amount of time, such as an amount of time needed for the user device to process the first video data. In some implementations, the user may make the first facial expression and/or the first eye gaze direction at the same time (or substantially the same time) as the user makes the first utterance. In some implementations, the user device (e.g., via the user device executing the one or more applications) may obtain the first video data while the user device obtains the image, after the user device obtains the image, after the user device prompts the user to comment on the product, and/or the like. In some implementations, the user device may obtain the first video data using the camera device of the user device. In some implementations, the user device may obtain the first video data using a different camera of the one or more cameras of the camera device than the camera of the one or more cameras of the camera device used by the user device to obtain the image. For example, the user device may obtain the image using a back-facing camera of the user device and the user device may obtain the first video data using a front-facing camera of the user device.

As shown by reference number 108, the user device may process the first audio data and the first video data to determine a first reaction of the user. In some implementations, the first reaction concerns a reaction of the user to the product, one or more attributes of the product, the image, and/or the like. The one or more attributes of the product may be a price of the product, one or more characteristics of the product (e.g., a color of the product, a size of the product, a shape of the product, and/or the like), a condition of the product (e.g., an indication that the product is new, old, used, damaged, repaired, refurbished, and/or the like), a location of the product, one or more features of the product, one or more capabilities of the product, and/or the like.

In some implementations, the user device may process the first audio data as the first audio data is obtained by the user device (e.g., in real-time or substantially real-time). In some implementations, the user device may process the first audio data as the first audio data is obtained and before the audio data is temporarily stored in memory. In some implementations, the user device may process the first audio data as the first audio data is obtained and after the audio data is temporarily stored in memory.

In some implementations, the user device may process the first audio data using a natural language processing technique to identify the first utterance. For example, the user device may use a natural language machine learning service, such as Microsoft's Language Understanding Intelligent Service (LUIS), IBM's Watson Assistant service, and/or the like, to process the first audio data to identify one or more first words spoken by the user. As another example, the user device may process the first audio data using a speech recognition technique to identify the one or more first words spoken by the user. In some implementations, the user device may process the first utterance using a sentiment analysis technique. For example, the user device may perform a sentiment analysis of the first utterance to categorize the first utterance as a positive utterance, a neutral utterance, a negative utterance, and/or the like. In some implementations, the user device may determine that the first utterance, the one or more first words, and/or a sentiment category of the first utterance concerns the product, the one or more attributes of the product, the image, and/or the like.

In some implementations, the user device may process the first video data as the first video data is obtained by the user device (e.g., in real-time or substantially real-time). In some implementations, the user device may process the first video data as the first video data is obtained and before the video data is temporarily stored in memory. In some implementations, the user device may process the first video data as the first video data is obtained and after the video data is temporarily stored in memory.

In some implementations, the user device may process the first video data using a facial analysis technique, such as an algorithm that analyzes the first video data according to the Facial Action Coding System (FACS), to identify the first facial expression. In some implementations, the user device may process the first facial expression using a sentiment analysis technique. For example, the user device may perform a sentiment analysis of the first facial expression to categorize the first facial expression as a positive facial expression, a neutral facial expression, a negative facial expression, and/or the like. In some implementations, the user device may process the first video data using an emotion recognition technique to identify a first emotion of the user. In some implementations, the user device may determine that the first facial expression, a sentiment category of the first facial expression, and/or the first emotion of the user concerns the product, the one or more attributes of the product, the image, and/or the like.

In some implementations, the user device may process the first video data to determine the first eye gaze direction of the user relative to the product. In some implementations, a display on the user device may display multiple images of a product and/or information regarding more than one attribute of the product. It is advantageous to determine which particular aspects of the displayed product or information are associated with first reaction data. For example, the user device may process the first video data using an eye gaze direction analysis technique to identify a first attribute, of the one or more attributes of the product, observed by the user. The user device may associate the first attribute, of the one or more attributes, with the sentiment category or the first emotion based on determining a temporal relationship between the first reaction data and the eye gaze of the user. In some implementations, the user device may determine the eye gaze direction of the customer by identifying one or more eyes of the user and tracking movement of the one or more eyes. For example, the user device may identify and track movement of one or more eyes of the user and, based on the movement of the one or more eyes (e.g., movement of an iris of the one or more eyes), determine that the first eye gaze direction of the user is pointed toward the product. In some implementations, the user device may use an eye motion and classification algorithm to identify and track movement of the one or more eyes of the user and determine the first eye gaze direction of the user. In some implementations, the user device may determine that the first eye gaze direction of the user concerns the product, the one or more attributes of the product, the image, the one or more attributes of the image, and/or the like. In this way, the first reaction data may be associated with one or more aspects of the product, the one or more attributes of the product, the image, the one or more attributes of the image, and/or the like that are determined to have been observed based on the eye gaze analysis.

In some implementations, the user device may determine the first reaction based on any one or more of the first utterance, the first facial expression, the first eye gaze direction, the one or more first words, a sentiment category of the first utterance, the first emotion, a sentiment category of the first facial expression, the first attribute of the product observed by the user, and/or the like. In some implementations, the user device may determine that the first reaction is a positive reaction, a negative reaction, a neutral reaction, and/or the like. In some implementations, the user device may determine that the first reaction concerns a reaction of the user to the product, the one or more attributes of the product, the image, and/or the like.

Figure 1C:
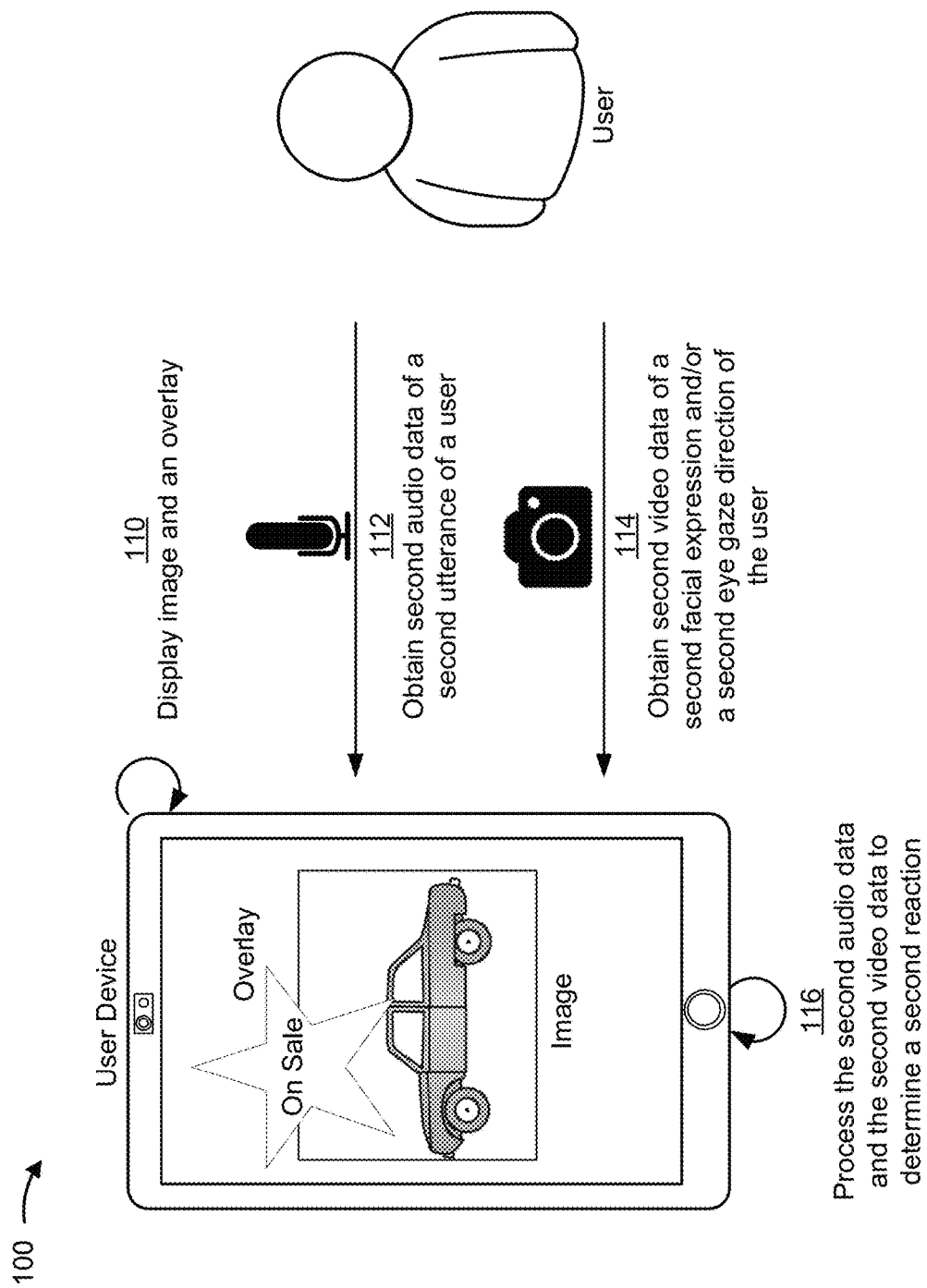

As shown in FIG. 1C, the user device may obtain and process additional audio data and video data concerning the user to determine a second reaction of the user to the image, the one or more attributes of the image, product information, and/or an overlay. As shown by reference number 110, the user device (e.g., via the user device executing the one or more applications) may display the image and/or the overlay. In some implementations, the overlay is superimposed on the image. In some implementations, the overlay is an augmented reality (AR) overlay.

In some implementations, the user device may process the image data to determine product information. For example, where the product is a car, the user device may process the image data to identify the car (e.g., by using an object recognition algorithm) and, based on identifying the car, look up product information concerning the car or the type of car in a data structure (e.g., communicate with the server device to look up information concerning the car in a data structure of the server device). In some embodiments, the product information may correspond to a particular car or a representative car of the same type etc. The product information concerning the car may include: a make of the car, a model of the car, a model year of the car, a price of the car, a safety feature of the car (e.g., anti-lock brakes, airbags, automatic cruise control, and/or the like), a condition of the car (e.g., whether the car has scratches, dents, engine issues, brake issues, and/or the like), a mileage of the car, a transmission type of the car (e.g., an automatic transmission and/or a manual transmission), a seller of the car (e.g., a dealership, a private seller, an auction house, and/or the like), an ownership history of the car (e.g., chain of custody of the vehicle, use of the vehicle as a rental car, and/or the like), an accident report for the car, an availability of the car (e.g., whether the car is rare, whether the car is on backorder, and/or the like). In some implementations, the user device may generate the overlay based on the product information. For example, the overlay may include text and/or images that indicate some or all of the product information. In some implementations, product information may be provided for display on the user device without superimposing on the image.

As shown by reference number 112, the user device may obtain second audio data of a second utterance of the user in a similar manner as described herein in relation to FIG. 1B. For example, the user device (e.g., via the user device executing the one or more applications) may obtain the second audio data of the second utterance using the one or more microphones of the user device. In some implementations, the user device may temporarily store the second audio data in memory (e.g., volatile memory) for a particular amount of time, such as an amount of time needed for the user device to process the second audio data. In some implementations, the user device may prompt the user device to comment on the display of the image and/or the overlay. In some implementations, the user device may obtain the second audio data after the user device displays the image and/or the overlay, after the user device prompts the user to comment on the display of the image and the AR overlay, and/or the like. In some implementations, the second utterance concerns the display of the image and/or the overlay and/or the product information.

As shown by reference number 114, the user device may obtain second video data of a second facial expression and/or a second eye gaze direction of the user in a similar manner as described herein in relation to FIG. 1B. For example, the user device (e.g., via the user device executing the one or more applications) may obtain the second video data using the camera device of the user device. In some implementations, the user device may temporarily store the second video data in memory (e.g., volatile memory) for a particular amount of time, such as an amount of time needed for the user device to process the second video data. In some implementations, the user device may obtain the second video data using a different camera of the one or more cameras of the camera device than the camera of the one or more cameras of the camera device used by the user device to obtain the image. In some implementations, the user device may obtain the second video data using the same camera as the camera used to obtain the first video data. In some implementations, the user device may obtain the second video data after the user device displays the image and/or the overlay, after the user device prompts the user to comment on the display of the image and the AR overlay, and/or the like.

As shown by reference number 116, the user device may process the second audio data and the second video data to determine a second reaction of the user in a similar manner as described herein in relation to FIG. 1B. For example, the user device may process the second audio data and the second video data as the second audio data and second video data are obtained by the user device (e.g., in real-time or substantially real-time) to determine a second reaction of the user to the image and/or the overlay. In some implementations, the second reaction concerns a reaction of the user to the image, the overlay, the product information, and/or the like.

In some implementations, the user device may process the second audio data to identify the second utterance, one or more second words spoken by the user, a sentiment category of the second utterance, and/or the like. The user device may determine that the second utterance, the one or more first words, and/or the sentiment category of the second utterance concerns the image, the overlay, the product information, and/or the like. In some implementations, the user device may process the second video data to identify the second facial expression, a sentiment category of the second facial expression, a second emotion of the user, and/or the like. The user device may determine that the second facial expression, the sentiment category of the second facial expression, and/or the second emotion of the user concerns the image, the overlay, the product information, and/or the like. In some implementations, the user device may process the second video data to identify the second eye gaze direction, a second attribute of the product observed by the user, and/or the like. The user device may determine that the second eye gaze direction and/or the second attribute of the product observed by the user concerns the image, the overlay, the product information, and/or the like. In some implementations, the user device may determine the second reaction based on the second utterance, the second facial expression, the second eye gaze direction, the one or more second words, the sentiment category of the second utterance, the second emotion, the sentiment category of the second facial expression, the second attribute of the product observed by the user, and/or the like. In some implementations, the user device may determine that the second reaction is a positive reaction, a negative reaction, a neutral reaction, and/or the like. In some implementations, the user device may determine that the second reaction concerns a reaction of the user to the image, the overlay, the product information, and/or the like.

Figure 1D:
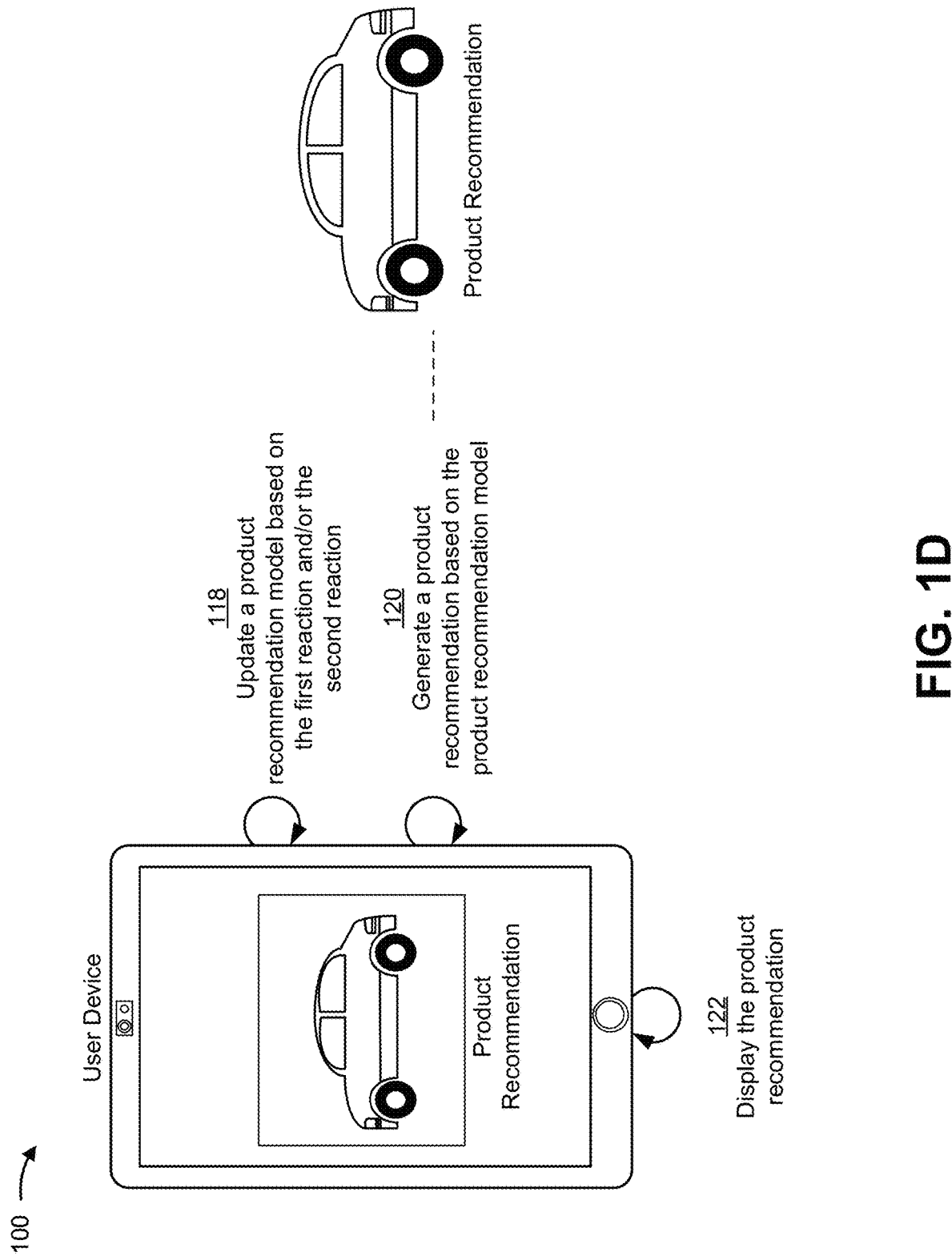

As shown in FIG. 1D, the user device may generate and/or determine a product recommendation and display the product recommendation. In some implementations, the user device may utilize a product recommendation model to generate and/or determine a product recommendation (e.g., a recommendation for a different product than the product) and/or a product recommendation profile (e.g., a profile that indicates one or more products that are different than the product or one or more products that have a different product type than the product). In some implementations, the user device may generate, train, retrain, update, and/or the like the product recommendation model using a machine learning technique.

For example, the user device may process historical reaction data (e.g., first reactions and/or second reactions of one or more users that occurred in the past) and historical display data (e.g., data related to one or more images and one or more overlays associated with the first reactions and/or the second reactions of one or more users that occurred in the past) to generate and/or train a machine learning model (e.g., the product recommendation model). In some implementations, the user device may process the historical reaction data and the historical display data to train the machine learning model to generate and/or determine a product recommendation and/or a product recommendation profile (e.g., a profile of a customer's product preferences based on the customer's reactions to particular products).

In some implementations, the user device may perform a set of data manipulation procedures to process the historical reaction data and the historical display data to generate the machine learning model, such as a data preprocessing procedure, a model training procedure, a model verification procedure, and/or the like. For example, the user device may preprocess the historical reaction data and the historical display data to remove numbers and/or letters, non-ASCII characters, other special characters, white spaces, confidential data, and/or the like. In this way, the user device may organize thousands, millions, or billions of data entries for machine learning and model generation—a data set that cannot be processed objectively by a human actor.

In some implementations, the user device (or the server device, as described herein) may perform a training operation when generating the machine learning model. For example, the user device may portion the historical reaction data and the historical display data into a training set, a validation set, a test set, and/or the like. In some implementations, the user device may train the machine learning model using, for example, an unsupervised training procedure and based on the training set of the data. In some implementations, the user device may perform dimensionality reduction to reduce the historical reaction data and the historical display data to a minimum feature set, thereby reducing processing to train the machine learning model, and may apply a classification technique, to the minimum feature set.

In some implementations, the user device may use a logistic regression classification technique to determine a categorical outcome (e.g., that particular historical reaction data and/or particular historical display data is associated with a particular product recommendation and/or a particular product recommendation profile). Additionally, or alternatively, the user device may use a naïve Bayesian classifier technique. In this case, the user device may perform binary recursive partitioning to split the data of the minimum feature set into partitions and/or branches, and use the partitions and/or branches to perform predictions (e.g., that particular historical reaction data and/or particular historical display data are associated with a particular product recommendation and/or a particular product recommendation profile). Based on using recursive partitioning, the user device may reduce utilization of computing resources relative to manual, linear sorting and analysis of data points, thereby enabling use of thousands, millions, or billions of data points to train the machine learning model, which may result in a more accurate machine learning model than using fewer data points.

Additionally, or alternatively, the user device may use a support vector machine (SVM) classifier technique to generate a non-linear boundary between data points in the training set. In this case, the non-linear boundary is used to classify test data (e.g., particular historical reaction data and/or particular historical display data) into a particular class (e.g., a class indicating that the particular historical reaction data and/or particular historical display data are associated with a particular product recommendation and/or a particular product recommendation profile).

Additionally, or alternatively, the user device may train the machine learning model using a supervised training procedure that includes receiving input to the model from a subject matter expert, which may reduce an amount of time, an amount of processing resources, and/or the like to train the machine learning model relative to an unsupervised training procedure. In some implementations, the user device may use one or more other model training techniques, such as a neural network technique, a latent semantic indexing technique, and/or the like. For example, the user device may perform an artificial neural network processing technique (e.g., using a two-layer feedforward neural network architecture, a three-layer feedforward neural network architecture, and/or the like) to perform pattern recognition with regard to patterns of particular historical reaction data and/or particular historical display data associated with a particular product recommendation and/or a particular product recommendation profile. In this case, using the artificial neural network processing technique may improve an accuracy of the machine learning model generated by the user device by being more robust to noisy, imprecise, or incomplete data, and by enabling the user device to detect patterns and/or trends undetectable to human analysts or systems using less complex techniques.

Accordingly, the user device may use any number of artificial intelligence techniques, machine learning techniques, deep learning techniques, and/or the like to generate, train, retrain, update, and/or the like a product recommendation model to determine a product recommendation and/or a product recommendation profile.

As shown by reference number 118, the user device may train, retrain, update, and/or the like the product recommendation model based on the first reaction and/or the second reaction. In some implementations, the user device may train, retrain, update, and/or the like the product recommendation model using the machine learning technique. For example, the user device may add the first reaction and/or the second reaction to the historical reaction data, add the image and/or the overlay to the historical display data, and retrain, update, and/or the like the product recommendation model using the historical reaction data and the historical display data.

Additionally, or alternatively, the user device may train, retrain, update, and/or the like the product recommendation model based on any one or more of the first utterance, the first facial expression, the first eye gaze direction, the one or more first words, the sentiment category of the first utterance, the first emotion, the sentiment category of the first facial expression, the first attribute of the product observed by the user, and/or the like. Similarly, the user device may train, retrain, update, and/or the like the product recommendation model based on any one of the second utterance, the second facial expression, the second eye gaze direction, the one or more second words, the sentiment category of the second utterance, the second emotion, the sentiment category of the second facial expression, the second attribute of the product observed by the user, and/or the like.

Additionally, or alternatively, the user device may train, retrain, update, and/or the like the product recommendation model based on additional information. The additional information may include information concerning the user (e.g., a salary of the user, a net worth of the user, a financial history of the user, a credit score of the user, and/or the like), a search history of the user (e.g., search queries concerning the product or similar products), and/or the like. The user device may obtain the additional information from a different device, such as the server device.

As shown by reference number 120, the user device may generate a product recommendation based on the product recommendation model. For example, the user device may process the first reaction, the second reaction, the image, and/or the overlay using the product recommendation model to generate and/or determine the product recommendation. As shown by reference number 122, the user device may cause display of the product recommendation by the user device in a similar manner as described herein in relation to FIG. 1C.

In some implementations, the user device may perform an automatic action in regard to a recommended product of the product recommendation. For example, the user device may automatically purchase the recommended product. As another example, the user device may submit an order for the recommended product. In some implementations, the order may be cancellable by the user for a period of time (e.g., 6 hours, 1 day, 1 week, and/or the like) before the order is finalized. In another example, the user device may automatically search for sellers of the recommended product and/or display the sellers of the recommended product on the user device. In an additional example, the user device may automatically search for pricing of the recommended product from the sellers and/or display the pricing on the user device. As a further example, the user device may automatically search financing options (e.g., obtain loan terms) for the recommended product and/or display the financing options. The user device may automatically adjust search terms for search financing options when the product recommendation model is retrained, updated, and/or the like.

Figure 1E:
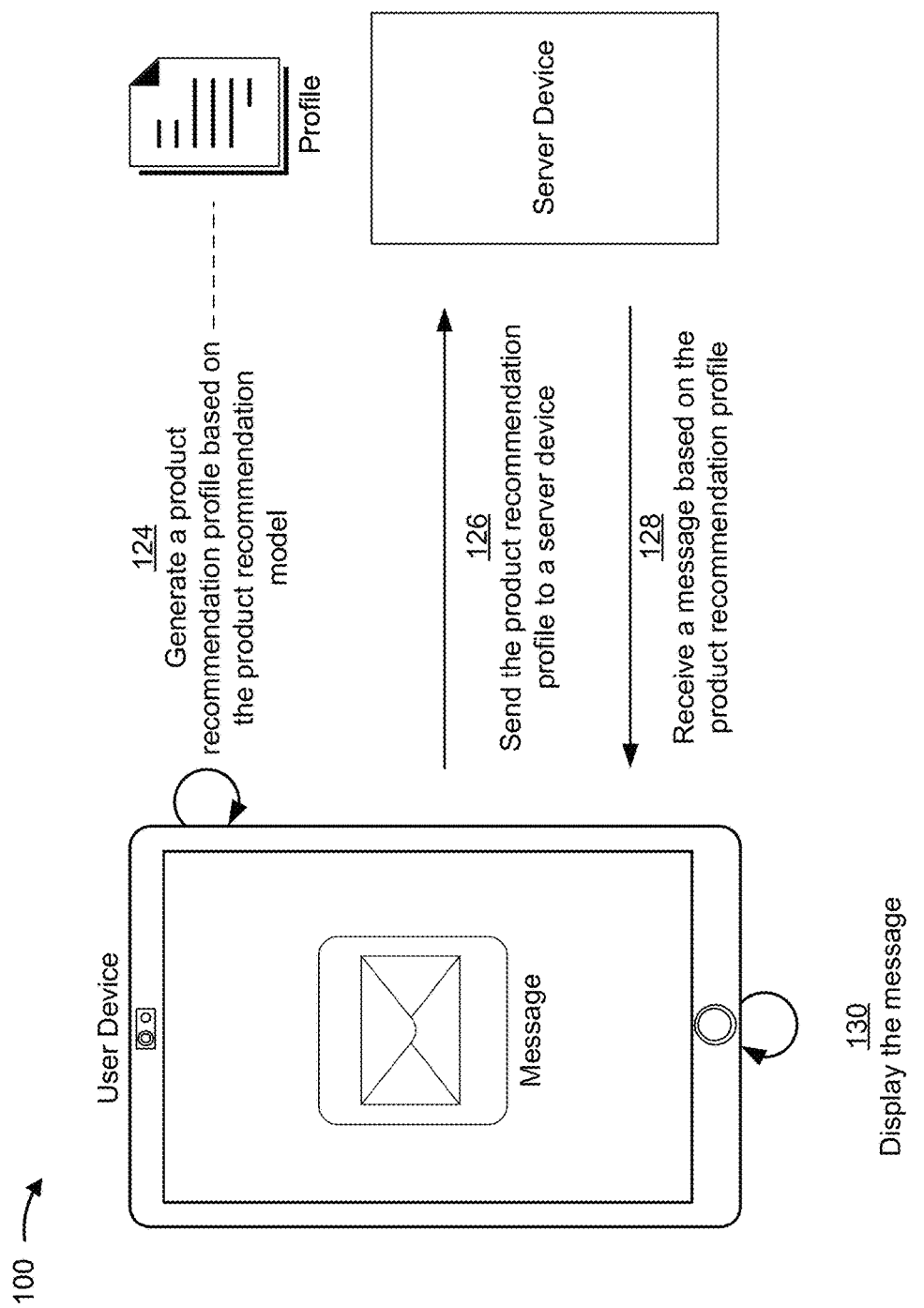

As shown in FIG. 1E, the user device may generate a product recommendation profile and communicate with the server device concerning the product recommendation profile. As shown by reference number 124, the user device may generate the product recommendation profile based on the product recommendation model. For example, the user device may process the first reaction, the second reaction, the image, and/or the overlay using the product recommendation model to generate and/or determine the product recommendation profile. In some implementations, the product recommendation profile may include information concerning a particular product type of the product. In some implementations, the product recommendation profile may include information concerning recommendations for a different product that has a different product type than the particular product type.

As shown by reference number 126, the user device may send the product recommendation profile to the server device. For example, the user device may send a first message that includes the product recommendation profile to the server device. The server device may receive the first message and parse the first message to identify the product recommendation profile. In some implementations, the server device may generate a second message based on the product recommendation profile, where the second message includes a recommendation for a related product. As shown by reference number 128, the server device may send the second message to the user device and the user device may receive the second message. As shown by reference number 130, the user device may display the second message that includes the recommendation for the related product in a similar manner as described herein in relation to FIG. 1C.

Some implementations describe the user device performing one or more functions described herein in relation to FIGS. 1A-1E, but implementations may include the server device performing the one or more functions. For example, the user device may send the image, the first audio data, and the first video data to the server device for the server device to process the first audio data and the first video data to determine the first reaction of the user to the product and/or the image in a similar manner as described herein in relation to FIG. 1B. As another example, the user device may send the image, the overlay, the second audio data, and the second video data to the server device for the server device to process the second audio data and the second video data to determine the second reaction of the user to the image and/or the overlay in a similar manner as described herein in relation to FIG. 1C. As a further example, the server device may generate, train, retrain, update, and/or the like the product recommendation model using a machine learning technique and generate the product recommendation based on the product recommendation model in a similar manner as described herein in relation to FIG. 1D. In another example, the server device may perform an automatic action in regard to a recommended product of the product recommendation profile in a similar manner as described herein in relation to FIG. 1D. As an additional example, the server device may generate the product recommendation profile based on the product recommendation model in a similar manner as described herein in relation to FIG. 1E.

As indicated above, FIGS. 1A-1E are provided merely as examples. Other examples are possible and may differ from what was described with regard to FIGS. 1A-1E.

Figure 2:
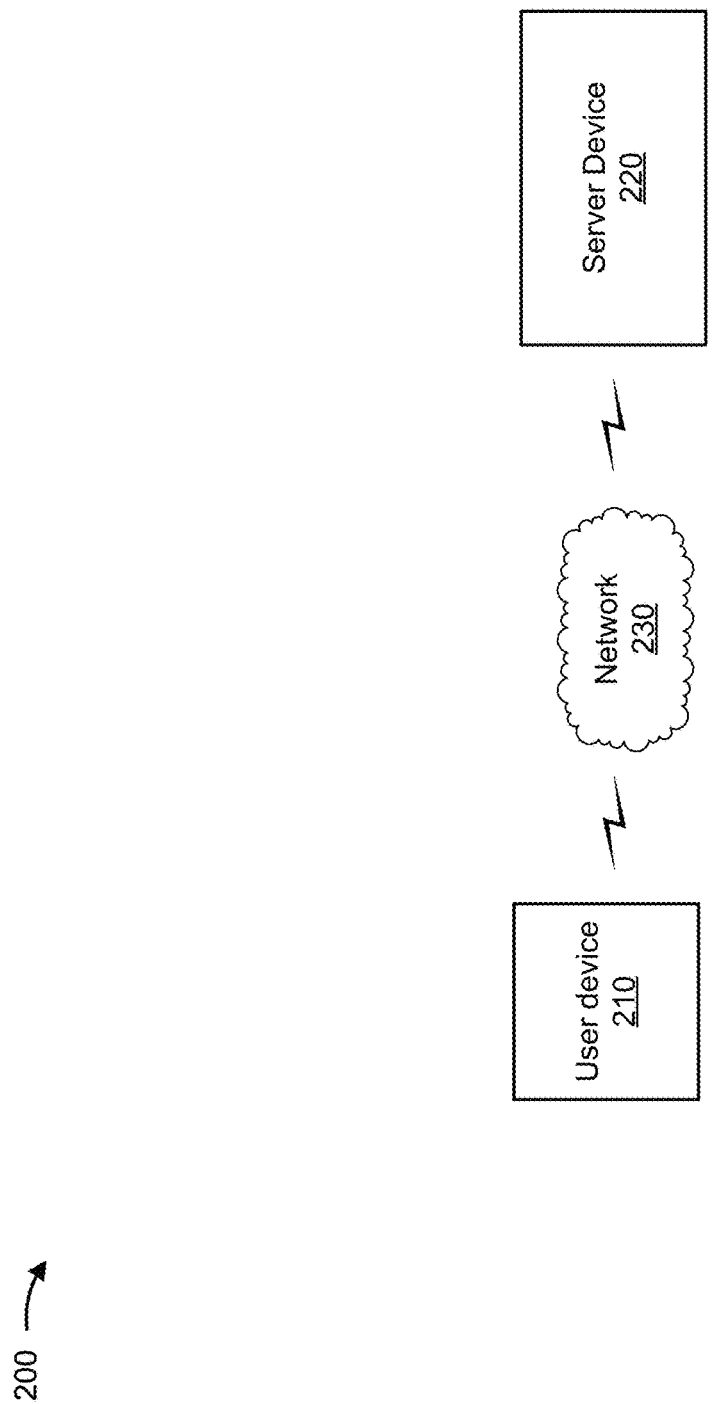
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, and a network 230. Devices of environment 200 may interconnect via wired connections, wireless connections, or a combination of wired and wireless connections.

User device 210 includes one or more devices capable of receiving, generating, storing, processing, and/or providing information associated with generating a product recommendation based on a user reaction. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 210 may obtain an image of a product, may display the image and an overlay, may obtain audio data and video data related to a user of the user device, may determine a reaction of the user, may generate a product recommendation model, may generate a product recommendation and/or a product recommendation profile, may display the product recommendation, may provide a product recommendation profile to server device 220, may receive a message based on the product recommendation profile from server device 220, may display the message, and/or the like.

Server device 220 includes one or more devices capable of receiving, storing, providing, generating, and/or processing information associated with generating a product recommendation based on a user reaction. For example, server device 220 may include a server device or a group of server devices (e.g., associated with a multi-server micro data center), a workstation computer or a group of workstation computers, a virtual machine (VM) or a group of virtual machines (VMs) implemented by one or more computing devices provided in a cloud computing environment, or a similar type or group of devices. In some implementations, server device 220 may determine a reaction of the user, may generate a product recommendation model, may generate a product recommendation and/or a product recommendation profile, may receive a product recommendation profile from user device 210, may provide a message to user device 210 based on the product recommendation profile, and/or the like.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a communications network, a telecommunications network, a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
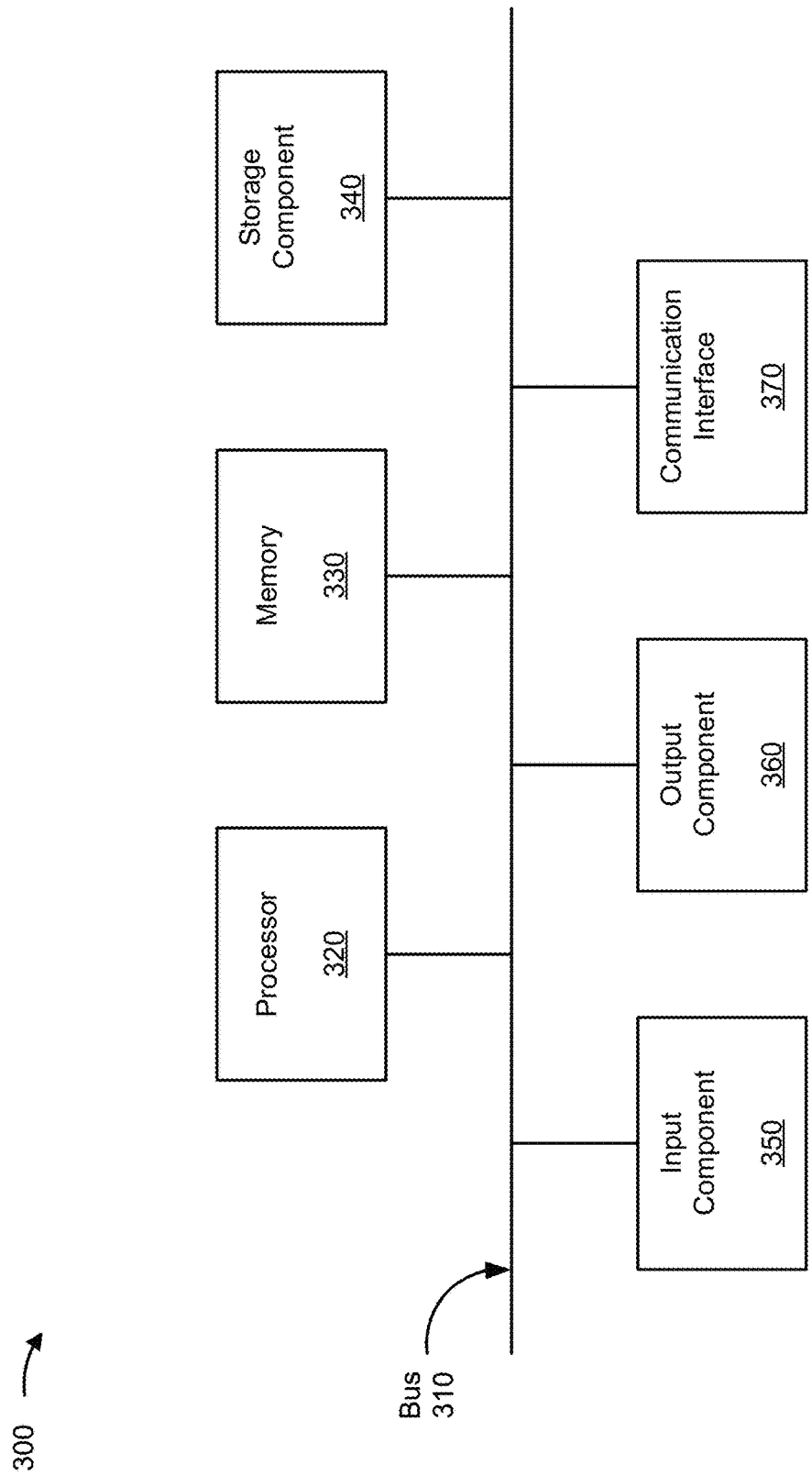
FIG. 3 is a diagram of example components of one or more devices of FIG. 2.

FIG. 3 is a diagram of example components of a device 300. Device 300 may correspond to user device 210 and/or server device 220. In some implementations, user device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, a camera, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
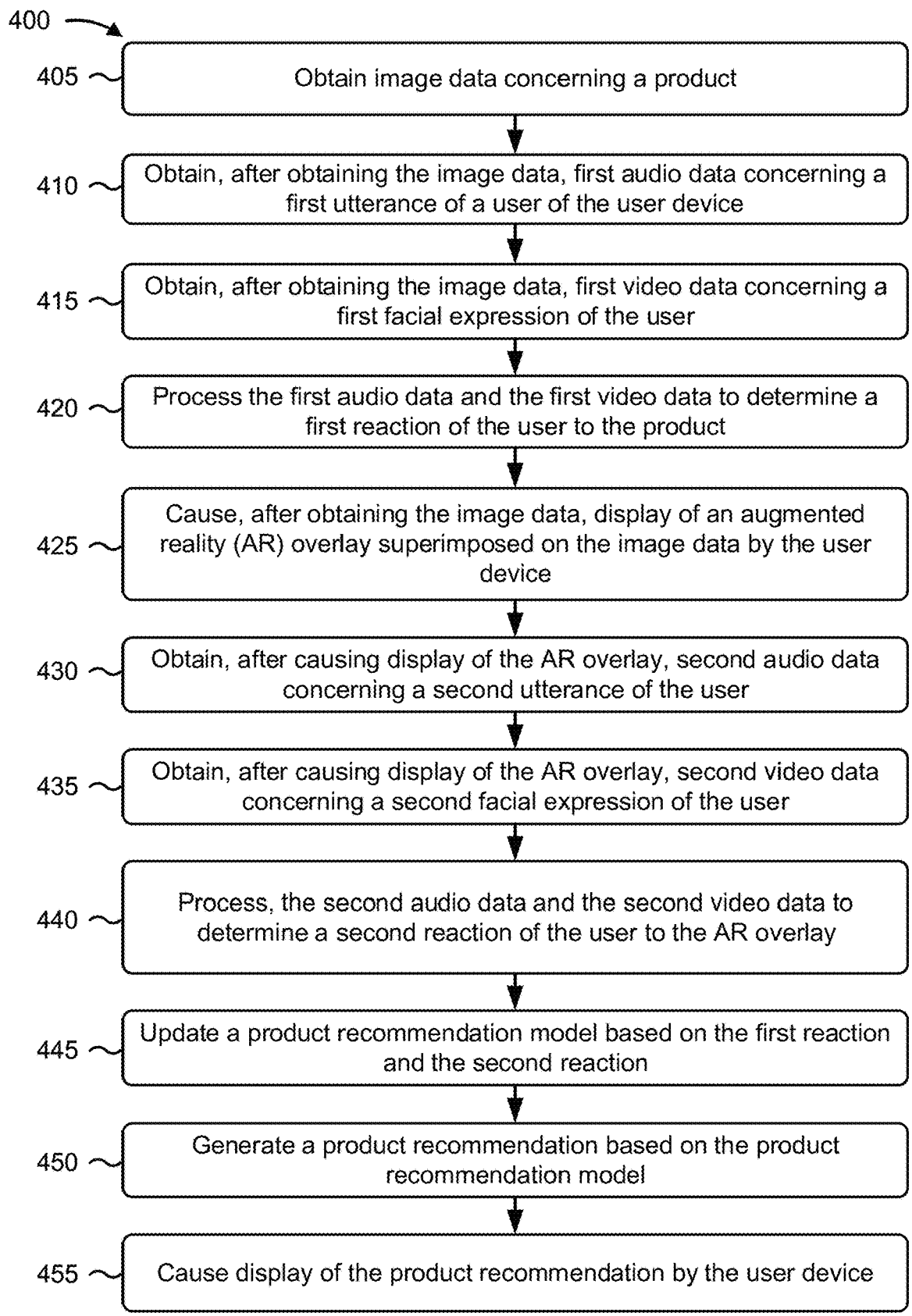
FIG. 4 is a flow chart of an example process for generating a product recommendation based on a user reaction.

FIG. 4 is a flow chart of an example process 400 for generating a product recommendation based on a user reaction. In some implementations, one or more process blocks of FIG. 4 may be performed by a user device (e.g., user device 210). In some implementations, one or more process blocks of FIG. 4 may be performed by another device or a group of devices separate from or including the user device, such as a server device (e.g., server device 220).

As shown in FIG. 4, process 400 may include obtaining image data concerning a product (block 405). For example, the user device (e.g., using processor 320, memory 330, storage component 340, input component 350, communication interface 370, and/or the like) may obtain image data concerning a product, as described above in connection with FIGS. 1A-1E.

As further shown in FIG. 4, process 400 may include obtaining, after obtaining the image data, first audio data concerning a first utterance of a user of the user device (block 410). For example, the user device (e.g., using processor 320, memory 330, storage component 340, input component 350, communication interface 370, and/or the like) may obtain, after obtaining the image data, first audio data concerning a first utterance of a user of the user device, as described above in connection with FIGS. 1A-1E.

As further shown in FIG. 4, process 400 may include obtaining, after obtaining the image data, first video data concerning a first facial expression of the user (block 415). For example, the user device (e.g., using processor 320, memory 330, storage component 340, input component 350, communication interface 370, and/or the like) may obtain, after obtaining the image data, first video data concerning a first facial expression of the user, as described above in connection with FIGS. 1A-1E.

As further shown in FIG. 4, process 400 may include processing the first audio data and the first video data to determine a first reaction of the user to the product (block 420). For example, the user device (e.g., using processor 320, memory 330, storage component 340, and/or the like) may process the first audio data and the first video data to determine a first reaction of the user to the product, as described above in connection with FIGS. 1A-1E.

As further shown in FIG. 4, process 400 may include causing, after obtaining the image data, display of the image and an augmented reality (AR) overlay superimposed on the image data by the user device (block 425). For example, the user device (e.g., using processor 320, memory 330, storage component 340, output component 360, communication interface 370, and/or the like) may cause, after obtaining the image data, display of the image and an augmented reality (AR) overlay superimposed on the image data by the user device, as described above in connection with FIGS. 1A-1E.

As further shown in FIG. 4, process 400 may include obtaining, after causing display of the AR overlay, second audio data concerning a second utterance of the user (block 430). For example, the user device (e.g., using processor 320, memory 330, storage component 340, input component 350, communication interface 370, and/or the like) may obtain, after causing display of the AR overlay, second audio data concerning a second utterance of the user, as described above in connection with FIGS. 1A-1E.

As further shown in FIG. 4, process 400 may include obtaining, after causing display of the AR overlay, second video data concerning a second facial expression of the user (block 435). For example, the user device (e.g., using processor 320, memory 330, storage component 340, input component 350, communication interface 370, and/or the like) may obtain, after causing display of the AR overlay, second video data concerning a second facial expression of the user, as described above in connection with FIGS. 1A-1E.

As further shown in FIG. 4, process 400 may include processing the second audio data and the second video data to determine a second reaction of the user to the AR overlay (block 440). For example, the user device (e.g., using processor 320, memory 330, storage component 340, and/or the like) may process the second audio data and the second video data to determine a second reaction of the user to the AR overlay, as described above in connection with FIGS. 1A-1E.

As further shown in FIG. 4, process 400 may include updating a product recommendation model based on the first reaction and the second reaction (block 445). For example, the user device (e.g., using processor 320, memory 330, storage component 340, and/or the like) may update a product recommendation model based on the first reaction and the second reaction, as described above in connection with FIGS. 1A-1E.

As further shown in FIG. 4, process 400 may include generating a product recommendation based on the product recommendation model (block 450). For example, the user device (e.g., using processor 320, memory 330, storage component 340, and/or the like) may generate a product recommendation based on the product recommendation model, as described above in connection with FIGS. 1A-1E.

As further shown in FIG. 4, process 400 may include causing display of the product recommendation by the user device (block 455). For example, the user device (e.g., using processor 320, memory 330, storage component 340, output component 360, communication interface 370, and/or the like) may cause display of the product recommendation by the user device, as described above in connection with FIGS. 1A-1E.

Process 400 may include additional implementations, such as any single implementation or any combination of implementations described below and/or in connection with one or more other processes described elsewhere herein.

In some implementations, when causing display of the image and the augmented reality (AR) overlay, the user device may process the image data to determine product information, and may generate the AR overlay based on the product information. In some implementations, when obtaining the image data concerning the product, the user device may obtain the image data using a first camera of the user device, where the user device, when obtaining the first video data concerning the first facial expression of the user and obtaining the second video data concerning the second facial expression of the user, obtains the first video data and the second video data using a second camera of the user device.

In some implementations, when obtaining the first audio data concerning the first utterance of the user of the user device, the user device may obtain the first audio data using a microphone of the user device, where the user device, when obtaining the second audio data concerning the second utterance of the user, obtains the second audio data using the microphone of the user device.

In some implementations, the product may be a car, and the AR overlay may include information that indicates at least one of a make of the car, a model of the car, a model year of the car, a price of the car, a safety feature of the car, a condition of the car, a mileage of the car, a transmission type of the car, a seller of the car, an ownership history of the car, an accident report for the car, or an availability of the car. In some implementations, when updating the product recommendation model based on the first reaction and the second reaction, the user device may update the product recommendation model using a machine learning technique.

In some implementations, when processing the first audio data and the first video data to determine the first reaction of the user to the product, the user device may process the first audio data using a natural language processing technique to identify the first utterance, may process the first video data using a facial analysis technique to identify the first facial expression, and may determine the first reaction based on the first utterance and the first facial expression. In some implementations, when determining the first reaction based on the first utterance and the first facial expression, the user device may process the first utterance and the first facial expression using a sentiment analysis technique.

In some implementations, when processing the second audio data and the second video data to determine the second reaction of the user to the AR overlay, the user device may process the second audio data using a speech recognition technique to identify one or more words spoken by the user, may process the second video data using an emotion recognition technique to identify an emotion of the user, and may determine the second reaction based on the one or more words and the emotion.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
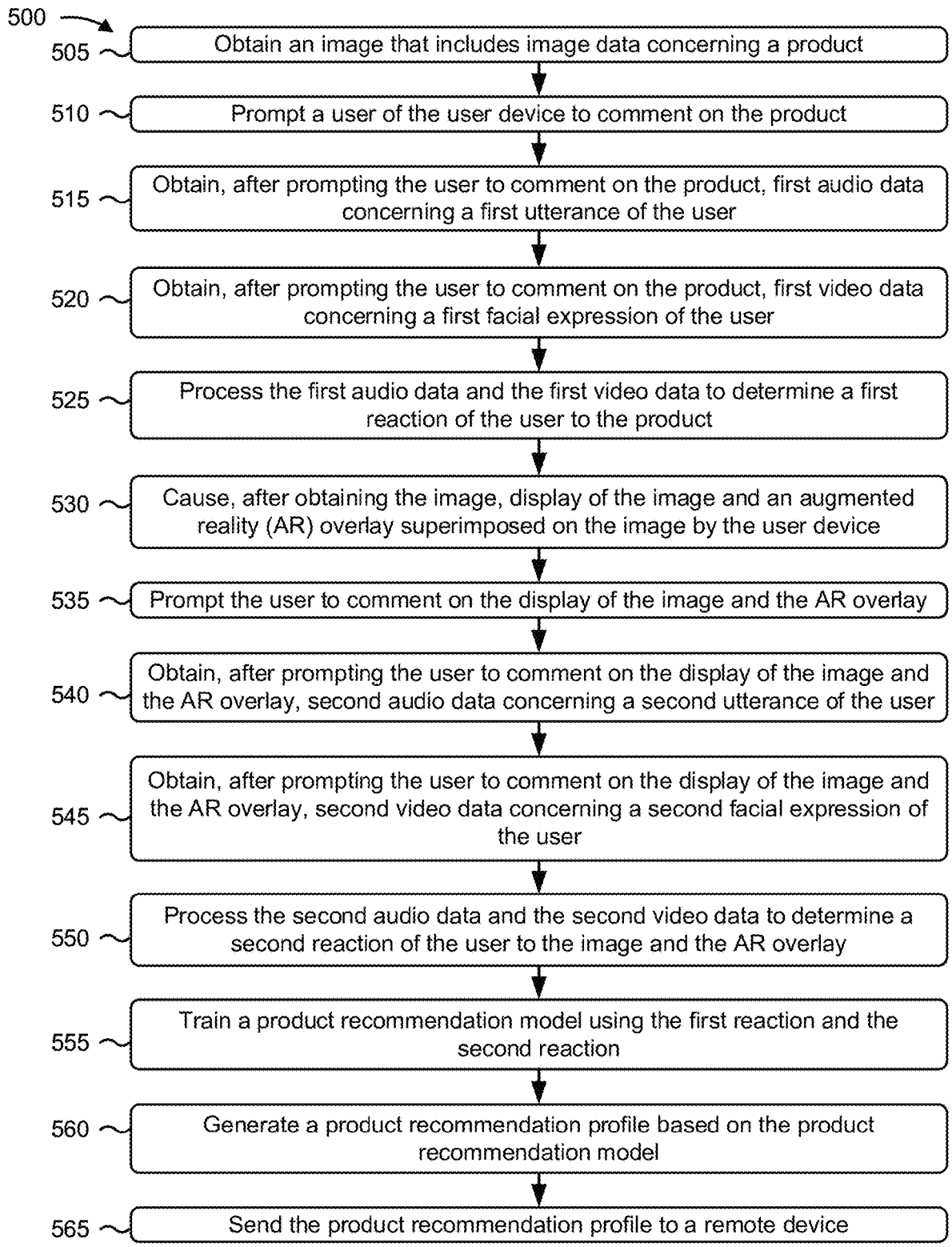
FIG. 5 is a flow chart of an example process for generating a product recommendation based on a user reaction.

FIG. 5 is a flow chart of an example process 500 for generating a product recommendation based on a user reaction. In some implementations, one or more process blocks of FIG. 5 may be performed by a user device (e.g., user device 210). In some implementations, one or more process blocks of FIG. 5 may be performed by another device or a group of devices separate from or including the user device, such as a server device (e.g., server device 220).

As shown in FIG. 5, process 500 may include obtaining an image that includes image data concerning a product (block 505). For example, the user device (e.g., using processor 320, memory 330, storage component 340, input component 350, communication interface 370, and/or the like) may obtain an image that includes image data concerning a product, as described above in connection with FIGS. 1A-1E.

As further shown in FIG. 5, process 500 may include prompting a user of the user device to comment on the product (block 510). For example, the user device (e.g., using processor 320, memory 330, storage component 340, output component 360, communication interface 370, and/or the like) may prompt a user of the user device to comment on the product, as described above in connection with FIGS. 1A-1E.

As further shown in FIG. 5, process 500 may include obtaining, after prompting the user to comment on the product, first audio data concerning a first utterance of the user (block 515). For example, the user device (e.g., using processor 320, memory 330, storage component 340, input component 350, communication interface 370, and/or the like) may obtain, after prompting the user to comment on the product, first audio data concerning a first utterance of the user, as described above in connection with FIGS. 1A-1E.

As further shown in FIG. 5, process 500 may include obtaining, after prompting the user to comment on the product, first video data concerning a first facial expression of the user (block 520). For example, the user device (e.g., using processor 320, memory 330, storage component 340, input component 350, communication interface 370, and/or the like) may obtain, after prompting the user to comment on the product, first video data concerning a first facial expression of the user, as described above in connection with FIGS. 1A-1E.

As further shown in FIG. 5, process 500 may include processing the first audio data and the first video data to determine a first reaction of the user to the product (block 525). For example, the user device (e.g., using processor 320, memory 330, storage component 340, and/or the like) may process the first audio data and the first video data to determine a first reaction of the user to the product, as described above in connection with FIGS. 1A-1E.

As further shown in FIG. 5, process 500 may include causing, after obtaining the image, display of the image and an augmented reality (AR) overlay superimposed on the image by the user device (block 530). For example, the user device (e.g., using processor 320, memory 330, storage component 340, output component 360, communication interface 370, and/or the like) may cause, after obtaining the image, display of the image and an augmented reality (AR) overlay superimposed on the image by the user device, as described above in connection with FIGS. 1A-1E.

As further shown in FIG. 5, process 500 may include prompting the user to comment on the display of the image and the AR overlay (block 535). For example, the user device (e.g., using processor 320, memory 330, storage component 340, output component 360, communication interface 370, and/or the like) may prompt the user to comment on the display of the image and the AR overlay, as described above in connection with FIGS. 1A-1E.

As further shown in FIG. 5, process 500 may include obtaining, after prompting the user to comment on the display of the image and the AR overlay, second audio data concerning a second utterance of the user (block 540). For example, the user device (e.g., using processor 320, memory 330, storage component 340, input component 350, communication interface 370, and/or the like) may obtain, after prompting the user to comment on the display of the image and the AR overlay, second audio data concerning a second utterance of the user, as described above in connection with FIGS. 1A-1E.

As further shown in FIG. 5, process 500 may include obtaining, after prompting the user to comment on the display of the image and the AR overlay, second video data concerning a second facial expression of the user (block 545). For example, the user device (e.g., using processor 320, memory 330, storage component 340, input component 350, communication interface 370, and/or the like) may obtain, after prompting the user to comment on the display of the image and the AR overlay, second video data concerning a second facial expression of the user, as described above in connection with FIGS. 1A-1E.

As further shown in FIG. 5, process 500 may include processing the second audio data and the second video data to determine a second reaction of the user to the image and the AR overlay (block 550). For example, the user device (e.g., using processor 320, memory 330, storage component 340, and/or the like) may process the second audio data and the second video data to determine a second reaction of the user to the image and the AR overlay, as described above in connection with FIGS. 1A-1E.

As further shown in FIG. 5, process 500 may include training a product recommendation model using the first reaction and the second reaction (block 555). For example, the user device (e.g., using processor 320, memory 330, storage component 340, and/or the like) may train a product recommendation model using the first reaction and the second reaction, as described above in connection with FIGS. 1A-1E.

As further shown in FIG. 5, process 500 may include generating a product recommendation profile based on the product recommendation model (block 560). For example, the user device (e.g., using processor 320, memory 330, storage component 340, and/or the like) may generate a product recommendation profile based on the product recommendation model, as described above in connection with FIGS. 1A-1E.

As further shown in FIG. 5, process 500 may include sending the product recommendation profile to a remote device (block 565). For example, the user device (e.g., using processor 320, memory 330, storage component 340, output component 360, communication interface 370, and/or the like) may send the product recommendation profile to a remote device, as described above in connection with FIGS. 1A-1E.

Process 500 may include additional implementations, such as any single implementation or any combination of implementations described below and/or in connection with one or more other processes described elsewhere herein.

In some implementations, when prompting the user of the user device to comment on the product, the user device may cause display by the user device of a message asking the user to talk about the product. In some implementations, when prompting the user to comment on the display of the image and the AR overlay, the user device may cause the user device to display a message that instructs the user to discuss the image and the AR overlay.

In some implementations, the product may have a particular product type, and the product recommendation profile may include information concerning the particular product type. In some implementations, the product may have a particular product type, and the product recommendation profile may include information concerning recommendations for a different product that has a different product type than the particular product type.

In some implementations, the user device may receive a message from the remote device, where the message was generated by the remote device based on the product recommendation profile, and where the message includes a recommendation for a related product.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
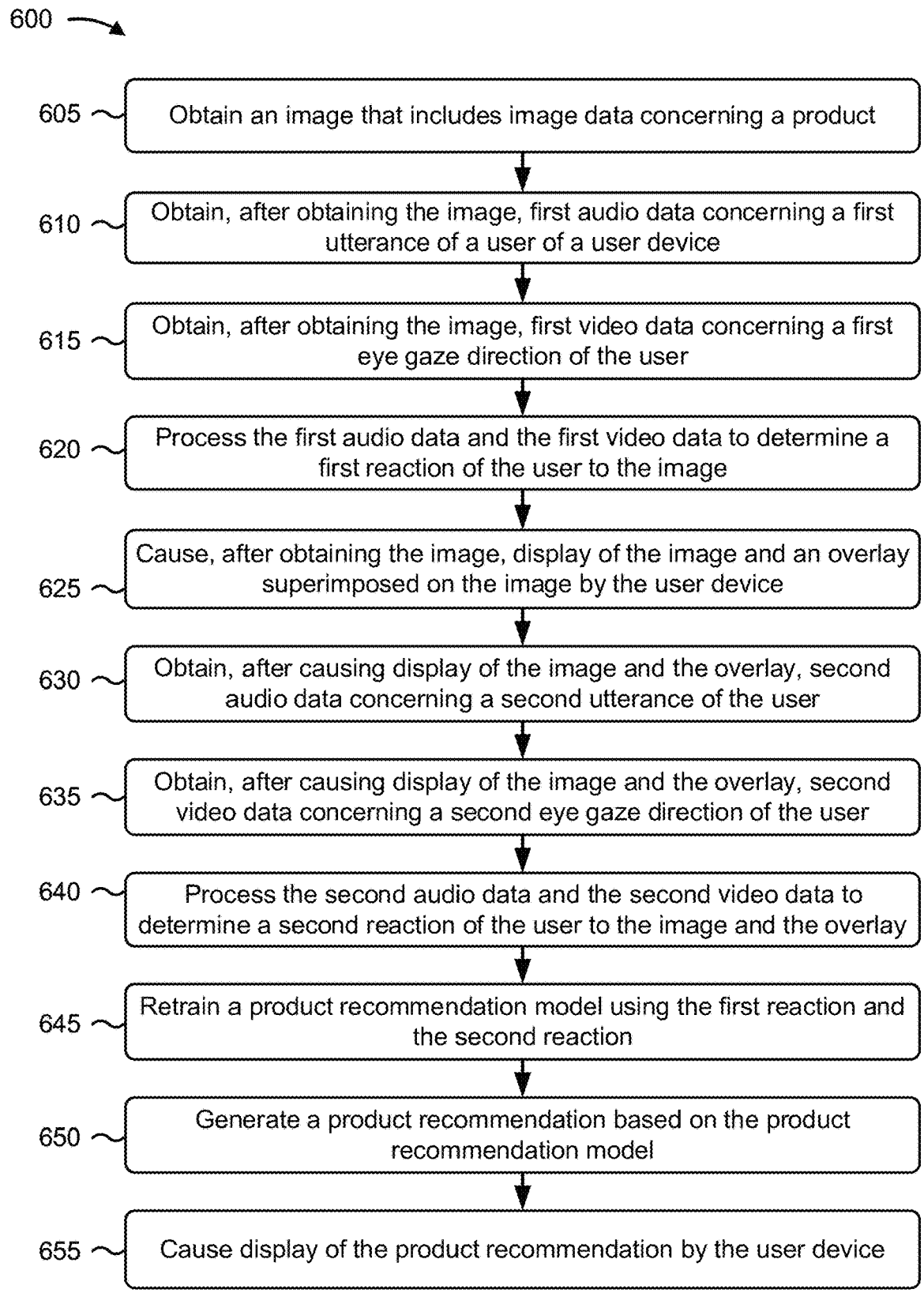
FIG. 6 is a flow chart of an example process for generating a product recommendation based on a user reaction.

FIG. 6 is a flow chart of an example process 600 for generating a product recommendation based on a user reaction. In some implementations, one or more process blocks of FIG. 6 may be performed by a server device (e.g., server device 220). In some implementations, one or more process blocks of FIG. 6 may be performed by another device or a group of devices separate from or including the server device, such as a user device (e.g., user device 210).

As shown in FIG. 6, process 600 may include obtaining an image that includes image data concerning a product (block 605). For example, the server device (e.g., using processor 320, memory 330, storage component 340, input component 350, communication interface 370, and/or the like) may obtain an image that includes image data concerning a product, as described above in connection with FIGS. 1A-1E.

As further shown in FIG. 6, process 600 may include obtaining, after obtaining the image, first audio data concerning a first utterance of a user of a user device (block 610). For example, the server device (e.g., using processor 320, memory 330, storage component 340, input component 350, communication interface 370, and/or the like) may obtain, after obtaining the image, first audio data concerning a first utterance of a user of a user device, as described above in connection with FIGS. 1A-1E.

As further shown in FIG. 6, process 600 may include obtaining, after obtaining the image, first video data concerning a first eye gaze direction of the user (block 615). For example, the server device (e.g., using processor 320, memory 330, storage component 340, input component 350, communication interface 370, and/or the like) may obtain, after obtaining the image, first video data concerning a first eye gaze direction of the user, as described above in connection with FIGS. 1A-1E.

As further shown in FIG. 6, process 600 may include processing the first audio data and the first video data to determine a first reaction of the user to the image (block 620). For example, the server device (e.g., using processor 320, memory 330, storage component 340, and/or the like) may process the first audio data and the first video data to determine a first reaction of the user to the image, as described above in connection with FIGS. 1A-1E.

As further shown in FIG. 6, process 600 may include causing, after obtaining the image, display of the image and an overlay superimposed on the image by the user device (block 625). For example, the server device (e.g., using processor 320, memory 330, storage component 340, output component 360, communication interface 370, and/or the like) may cause, after obtaining the image, display of the image and an overlay superimposed on the image by the user device, as described above in connection with FIGS. 1A-1E.

As further shown in FIG. 6, process 600 may include obtaining, after causing display of the image and the overlay, second audio data concerning a second utterance of the user (block 630). For example, the server device (e.g., using processor 320, memory 330, storage component 340, input component 350, communication interface 370, and/or the like) may obtain, after causing display of the image and the overlay, second audio data concerning a second utterance of the user, as described above in connection with FIGS. 1A-1E.

As further shown in FIG. 6, process 600 may include obtaining, after causing display of the image and the overlay, second video data concerning a second eye gaze direction of the user (block 635). For example, the server device (e.g., using processor 320, memory 330, storage component 340, input component 350, communication interface 370, and/or the like) may obtain, after causing display of the image and the overlay, second video data concerning a second eye gaze direction of the user, as described above in connection with FIGS. 1A-1E.

As further shown in FIG. 6, process 600 may include processing the second audio data and the second video data to determine a second reaction of the user to the image and the overlay (block 640). For example, the server device (e.g., using processor 320, memory 330, storage component 340, and/or the like) may process the second audio data and the second video data to determine a second reaction of the user to the image and the overlay, as described above in connection with FIGS. 1A-1E.

As further shown in FIG. 6, process 600 may include retraining a product recommendation model using the first reaction and the second reaction (block 645). For example, the server device (e.g., using processor 320, memory 330, storage component 340, and/or the like) may retrain a product recommendation model using the first reaction and the second reaction, as described above in connection with FIGS. 1A-1E.

As further shown in FIG. 6, process 600 may include generating a product recommendation based on the product recommendation model (block 650). For example, the server device (e.g., using processor 320, memory 330, storage component 340, and/or the like) may generate a product recommendation based on the product recommendation model, as described above in connection with FIGS. 1A-1E.

As further shown in FIG. 6, process 600 may include causing display of the product recommendation by the user device (block 655). For example, the server device (e.g., using processor 320, memory 330, storage component 340, output component 360, communication interface 370, and/or the like) may cause display of the product recommendation by the user device, as described above in connection with FIGS. 1A-1E.

Process 600 may include additional implementations, such as any single implementation or any combination of implementations described below and/or in connection with one or more other processes described elsewhere herein.

In some implementations, when processing the first audio data and the first video data to determine the first reaction of the user to the image, the server device may process the first video data to identify one or more eyes of the user, may track movement of the one or more eyes of the user, and may determine the first eye gaze direction based on the movement of the one or more eyes of the user. In some implementations, when processing the first audio data and the first video data to determine the first reaction of the user to the image, the server device may process the first audio data using a natural language processing technique to determine the first utterance, may process the first video data using an eye tracking analysis technique to determine the first eye gaze direction, and may determine the first reaction based on the first utterance and the first eye gaze direction.

In some implementations, when processing the second audio data and the second video data to determine the second reaction of the user to the image and the overlay, the server device may process the second audio data using a speech recognition technique to identify one or more words spoken by the user, may process the second video data using an eye gaze direction analysis technique to identify an attribute of the product observed by the user, and may determine the second reaction based on the one or more words and the attribute of the product observed by the user. In some implementations, the image may have been obtained using a first camera of the user device, and the first video data and the second video data may have been obtained using a second camera of the user device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    obtaining, via a first camera of a mobile device, image data concerning a product;
    causing, by the mobile device and after obtaining the image data, display of product information with the image data by the mobile device;
    obtaining, by a second camera of the mobile device and after causing display of the product information, first video data concerning a facial expression of a user, the first camera facing a different direction than the second camera;
    processing, by the mobile device, the first video data to cause a reaction of the user to the product information to be determined; and
    causing, by the mobile device, display of a product recommendation generated based on the reaction.

2. The method of claim 1, wherein causing display of the product information with the image data comprises:
    processing the image data to cause the product information to be determined;
    generating an AR overlay that represents the product information; and
    causing the AR overlay to be displayed as the product information.

3. The method of claim 2, wherein the AR overlay is superimposed on the image data when displayed.

4. The method of claim 2, wherein the product is a car, and wherein the AR overlay includes information that indicates at least one of:
    a make of the car;
    a model of the car;
    a model year of the car;
    a price of the car;
    a safety feature of the car;
    a condition of the car;
    a mileage of the car;
    a transmission type of the car;
    a seller of the car;
    an ownership history of the car;
    an accident report for the car; or
    an availability of the car.

5. The method of claim 1, wherein processing the first video data to cause the reaction of the user to the product to be determined comprises:
    processing the first video data using a facial analysis technique to identify the facial expression; and
    causing the reaction to be determined based on the facial expression.

6. The method of claim 1, wherein the first camera is on an opposite side of the mobile device than the second camera.

7. The method of claim 1, wherein processing the first video data to cause the reaction of the user to the product to be determined comprises:
    processing the first video data to identify one or more eyes of the user;
    tracking movement of the one or more eyes of the user;
    determining an eye gaze direction based on the movement of the one or more eyes of the user;
    determining an attribute of the product information observed by the user based on the eye gaze direction; and
    associating the reaction with the attribute of the product observed by the user.

8. A mobile device, comprising:
    a first camera;
    a second camera;
    one or more memories; and
    one or more processors, communicatively coupled to the one or more memories, to:
        obtain, via the first camera, image data concerning a product;
        cause, after the image data is obtained, display of product information with the image data by the mobile device;
        obtain, via the second camera and after causing display of the product information, first video data concerning a facial expression of a user,
            the first camera facing a different direction than the second camera;
        process the first video data to cause a reaction of the user to the product information to be determined; and
        cause display of a product recommendation generated based on the reaction.

9. The mobile device of claim 8, wherein the one or more processors, when causing display of the product information with the image data, are to:
    process the image data to cause the product information to be determined;
    generate an augmented reality (AR) overlay that represents the product information; and
    cause the AR overlay to be displayed as the product information.

10. The mobile device of claim 9, wherein the AR overlay is superimposed on the image data when displayed.

11. The mobile device of claim 9, wherein the product is a car, and
    wherein the AR overlay includes information that indicates at least one of:
        a make of the car;
        a model of the car;
        a model year of the car;
        a price of the car;
        a safety feature of the car;
        a condition of the car;
        a mileage of the car;
        a transmission type of the car;
        a seller of the car;
        an ownership history of the car;
        an accident report for the car; or
        an availability of the car.

12. The mobile device of claim 8, wherein the one or more processors, when processing the first video data to cause the reaction of the user to the product to be determined, are to:
    process the first video data using a facial analysis technique to identify the facial expression; and
    cause the reaction to be determined based on the facial expression.

13. The mobile device of claim 8, wherein the first camera is on an opposite side of the mobile device than the second camera.

14. The mobile device of claim 8, wherein the one or more processors, when processing the first video data to cause the reaction of the user to the product to be determined, are to:
   process the first video data to identify one or more eyes of the user;
   track movement of the one or more eyes of the user;
   determine an eye gaze direction based on the movement of the one or more eyes of the user;
   determine an attribute of the product information observed by the user based on the eye gaze direction; and
   associate the reaction with the attribute of the product observed by the user.

15. A non-transitory computer-readable medium storing instructions, the instructions comprising:
   one or more instructions that, when executed by one or more processors of a mobile device, cause the one or more processors to:
      obtain, via a first camera of the mobile device, image data concerning a product;
      cause, after the image data is obtained, display of product information with the image data by the mobile device;
      obtain, via a second camera of the mobile device and after causing display of the product information, first video data concerning a facial expression of a user, the first camera facing a different direction than the second camera;
      process the first video data to cause a reaction of the user to the product information to be determined; and
      cause display of a product recommendation generated based on the reaction.

16. The non-transitory computer-readable medium of claim 15, wherein the one or more instructions, that cause the one or more processors to cause display of the product information with the image data, cause the one or more processors to:
   process the image data to cause the product information to be determined;
   generate an augmented reality (AR) overlay that represents the product information; and
   cause the AR overlay to be displayed as the product information.

17. The non-transitory computer-readable medium of claim 16, wherein the AR overlay is superimposed on the image data when displayed.

18. The non-transitory computer-readable medium of claim 16, wherein the product is a car, and
   wherein the AR overlay includes information that indicates at least one of:
      a make of the car;
      a model of the car;
      a model year of the car;
      a price of the car:
      a safety feature of the car;
      a condition of the car;
      a mileage of the car;
      a transmission type of the car;
      a seller of the car;
      an ownership history of the car;
      an accident report for the car; or
      an availability of the car.

19. The non-transitory computer-readable medium of claim 15, wherein the one or more instructions, that cause the one or more processors to process the first video data to cause the reaction of the user to the product to be determined, cause the one or more processors to:
   process the first video data using a facial analysis technique to identify the facial expression; and
   cause the reaction to be determined based on the facial expression.

20. The non-transitory computer-readable medium of claim 15, wherein the first camera is on an opposite side of the mobile device than the second camera.

* * * * *